US007992586B1

(12) United States Patent
Bovee

(10) Patent No.: US 7,992,586 B1
(45) Date of Patent: Aug. 9, 2011

(54) RECEPTACLE FOR CATCHING AND RETAINING UNWANTED LIQUIDS

(76) Inventor: Teresa Bovee, Midland, MI (US)

( * ) Notice: Subject to any disclaimer, the term of this patent is extended or adjusted under 35 U.S.C. 154(b) by 293 days.

(21) Appl. No.: 12/384,758

(22) Filed: Apr. 8, 2009

(51) Int. Cl.
*F16K 23/00* (2006.01)

(52) U.S. Cl. .......................... 137/312; 222/108; 220/571

(58) Field of Classification Search .................. 137/312; 222/108, 573; 141/86; 220/571
See application file for complete search history.

(56) References Cited

U.S. PATENT DOCUMENTS 1,703,284 A * 2/1929 Wolfe ........................... 222/108
5,379,810 A * 1/1995 Marino ........................... 141/86
5,470,011 A 11/1995 Jordan
D384,244 S 9/1997 Hensarling
5,690,138 A 11/1997 Fuller
6,279,781 B1 8/2001 Konar
6,968,979 B2 * 11/2005 Gribble et al. ................ 222/108
7,103,944 B2 * 9/2006 Johnson ........................ 222/108
7,216,778 B2 5/2007 Kaeb
2007/0094913 A1 * 5/2007 Link ............................ 43/42.08

* cited by examiner

*Primary Examiner* — Kevin L Lee
(74) *Attorney, Agent, or Firm* — Robert L. McKellar; McKellar IP Law, PLLC

(57) ABSTRACT

A receptacle for catching and retaining unwanted liquids dropped by a spigot or nozzle. The receptacle is configured to hang on the spigot of a liquid dispenser such as a coffee urn, a water cooler, and the like. Because of the unique configuration of the opening in the back of the device, the device self levels, has the capability of more secure attachment to the liquid dispenser and prevents any unwanted liquids from escaping through the back opening thereof.

8 Claims, 2 Drawing Sheets

RECEPTACLE FOR CATCHING AND RETAINING UNWANTED LIQUIDS

The invention disclosed and claimed herein deals with a receptacle for catching and retaining unwanted liquids dropped by a spigot. The device is configured to hang on the spigot of a liquid dispenser such as a coffee urn, a water cooler such as an Igloo® brand water cooler, and the like (Igloo is a trademark owned by the Igloo company). More particularly, because of the unique configuration of the opening in the back of the device, the device self levels, has the capability of more secure attachment to the liquid dispenser and prevents any unwanted liquids from escaping through the back opening thereof.

BACKGROUND OF THE INVENTION

Dispensers for various liquids such as coffee, soft drinks, water, and the like have been available for many years. These dispensers are equipped with a delivery mode which is usually a spigot or nozzle that projects from the bottom side of the dispenser and usually has a means for stopping and starting the flow of liquid such as spring loaded button, or a lever that opens and closes a valve and the like.

All such devices have a common problem, in that any void space that is forward of the valve or nozzle retains a small amount of the liquid being dispensed, and when the button or lever is closed, the vacuum that is created in the forward part of the nozzle breaks, and releases the residual liquid. If there is nothing to catch this residual liquid, it is dispensed on the floor or ground. For example, it has been noted that a coffee urn, that has been used for approximately one-half hour, has dispensed enough residual coffee on to the table top, such table top being covered with a table cloth, that the entire table cloth was saturated with coffee.

A certain number of dispensers have built-in receptacles for catching such residual liquids, but this makes such dispensers cumbersome to move and store.

Devices that have been found in the patent literature are for example, the drip collector device disclosed in U.S. Pat. No. 5,470,011 that issued on Nov. 28, 1995 to Jordan which comprises a rear retaining member having a spigot slot which attaches to the spigot and a collection reservoir disposed below the spigot slot for collecting drips and overflows. The slot comprised an open, elongated vertical slot to enable it to be disposed over the spigot of the urn.

U.S. Design Pat. No. 384,244 that issued on Sep. 30, 1997 deals with a drip catcher having a similar vertical, elongated slot to enable the attachment of the device to a liquid dispenser.

U.S. Pat. No. 5,690,138 that issued on Nov. 25, 1997 to Fuller also discloses an elongated, vertical slot for hanging the device on a dispenser.

U.S. Pat. No. 6,279,781 that issued on Aug. 28, 2001 to Konar discloses a device that has a huge vertical elongated opening that is used to hang the device on a spigot of a dispenser.

U.S. Pat. No. 7,216,778 that issued on May 15, 2007 discloses a self-leveling drip catcher for fluid containers in which the opening is of sufficient size to accommodate the size of the spigot, but this device seems limited in use as it would not fit every variety of dispenser.

Thus, none of the prior art has disclosed a closed opening in the back wall for hanging the device on a dispenser and no prior art has disclosed the benefits of having such a device.

The receptacle of the instant invention is intended to provide an economical, easily attached and removed device that self levels, has the capability of more secure attachment to the liquid dispenser and prevents any unwanted liquids from escaping through the back opening of the device.

DETAILED DESCRIPTION OF THE INVENTION

Figure 1:
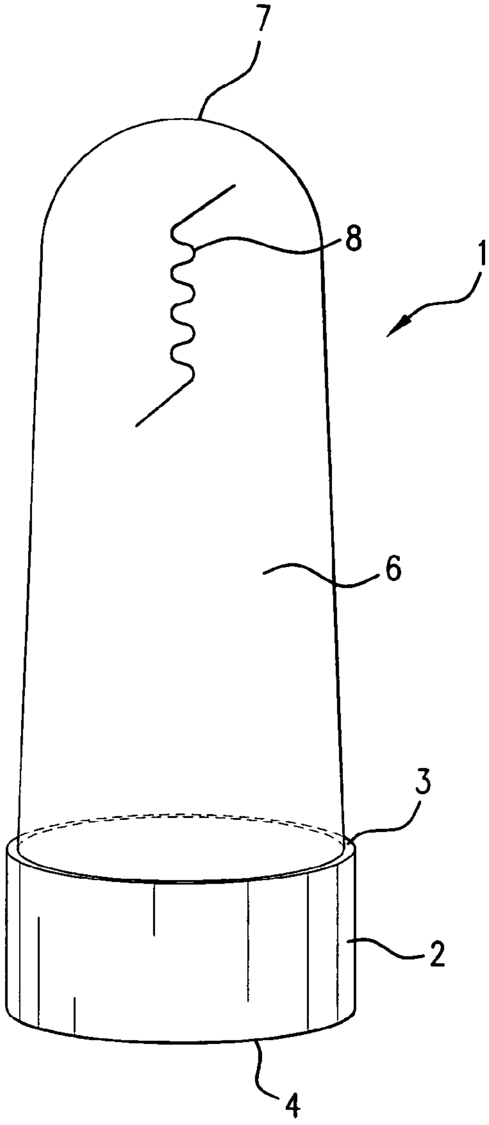
FIG. 1 is a full front view of a device of this invention.

Turning now to a detailed description of the receptacles of this invention, and with reference to FIG. 1, there is shown a full front view of one such receptacle 1.

Figure 2:
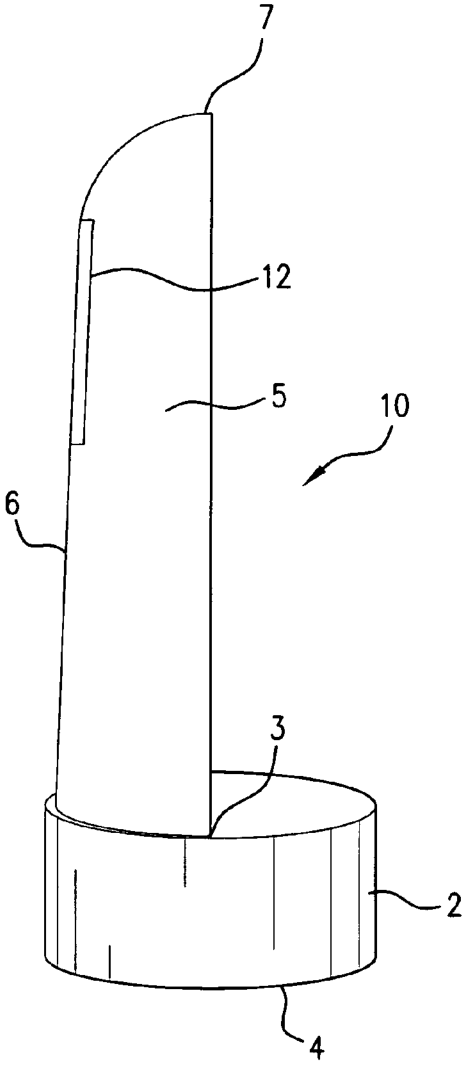
FIG. 2 is a full side view of the device of this invention.

There is shown therein the base member 2 having an upper end 3, a closed lower end 4, and integral, cylindrical side walls 5 (shown in FIG. 2) in combination with back wall 6. The back wall 6 has a top edge 7.

The back wall 6 has a securement opening 8 formed through it and near the top edge 7 thereof. The opening 8 has a serpentine configuration consisting of a single cut through the back wall 6.

The opening 8 is of sufficient size to accommodate the attachment of the receptacle 1 to any moderate size liquid dispensing devices.

It should be noted that the receptacle of this invention can be manufactured from flexible material such that when a spigot or nozzle is forced into the opening 8, the opening 8 will allow the spigot or nozzle to pass through, with the concomitant closing of the opening 8 around such spigot or nozzle. Such materials are for example, rubbers, elastomers, certain resins, plastics, for example, polyethylene, polypropylene, terephthalates, such as are used in soft drink bottles, and the like.

When the nozzle or spigot is forced through the opening 8, and the flexible material closes around the spigot or nozzle, there is provided a barrier to the transfer of any incidental liquids through the opening and outside of the receptacle.

Further, because the flexible material closes down around the spigot or nozzle, there is provided a positive means of retaining the receptacle on the spigot or nozzle. In addition, the contact of the flexible material, because it is flexible, allows for the receptacle to be self leveling around the spigot or nozzle and thus provides a tendency not to overflow because of being tipped one direction or another.

Figure 3:
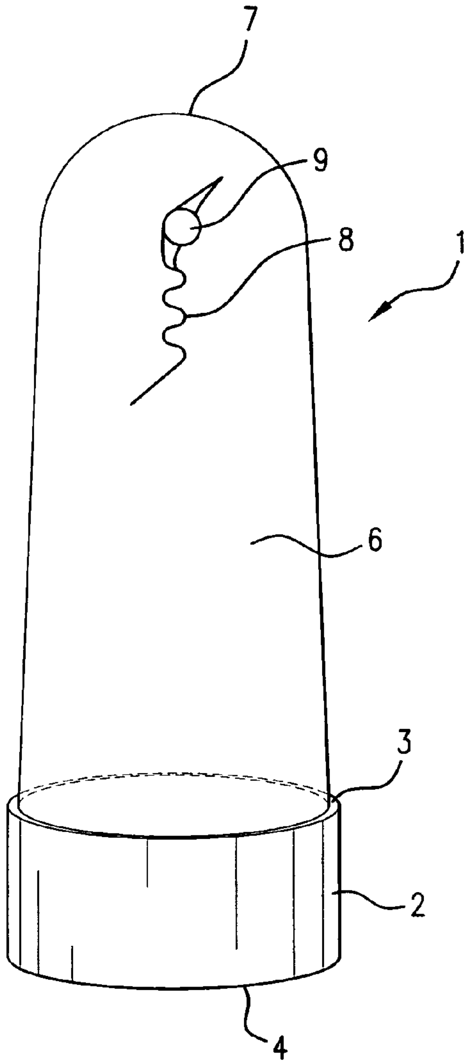
FIG. 3 is a full back view of the device of this invention.

FIG. 3 shows a full back view of the receptacle 1 showing a spigot 9 (the entire dispenser is not shown) that has been forced through the serpentine opening 8 to illustrate the aforementioned use.

Figure 4:
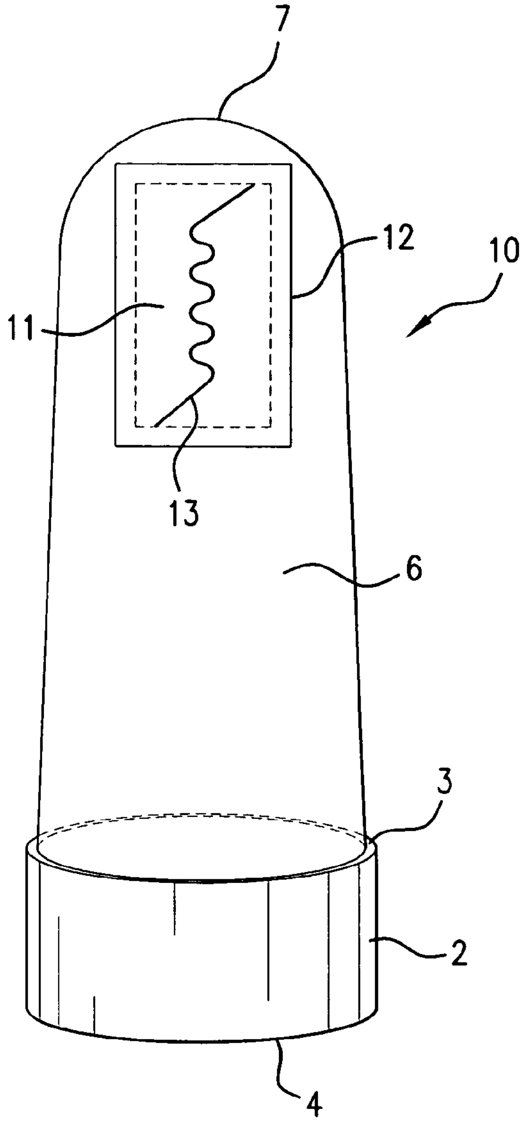
FIG. 4 is a full front view of the second embodiment of this invention.

Turning now to a second embodiment of this invention, there is shown in FIG. 4 a receptacle 10 wherein there is shown therein the base member 2 having an upper end 3, a closed lower end 4, and integral, cylindrical side walls 5 (shown in FIG. 2) in combination with back wall 6. The back wall 6 has a top edge 7.

The back wall 6 has a securement opening 11 formed through it (shown in phantom and in rectangular shape) and near the top edge 7 thereof. The opening 11 can have a square, rectangular or oval configuration, as the shape of the opening is not critical.

Surmounting the securement opening 11 is a patch 12. The patch 12 is adhered to the surface of the receptacle 10, either on the front surface of the back wall 6, or the back surface of the back wall 6, it being preferred that it be adhered to the front surface of the back wall 6.

The patch 12 is manufactured from the same type of materials set forth Supra for the manufacture of the receptacle 1, it being preferred that the patch 12 be manufactured from soft rubber or light weight plastic, soft rubber being most preferred.

Figure 5:
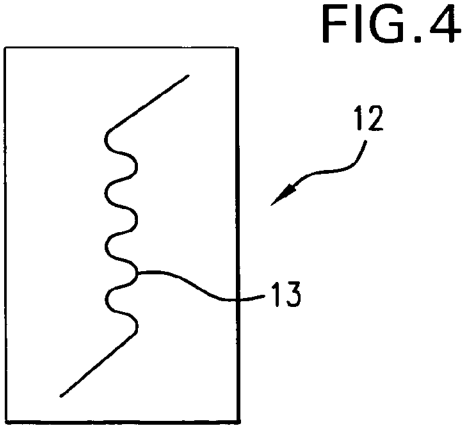
FIG. 5 is a full front view of the patch used in the second embodiment of this invention.

It should be noted that the patch 12 contains a serpentine cut opening 13 in it and this serpentine cut opening 13 operates in the same mode as the securement opening 8 of the receptacle 1. FIG. 5 shows a full front view of the patch 12 with the serpentine cut opening 13 shown therein.

The receptacles 1 and 10 must be sturdy enough such that they will not collapse by picking up weight from dripping material. It is preferred that the receptacles be dishwasher safe and long enough and wide enough for a tall glass to fit therein. It is therefore preferred within the scope of this invention to provide receptacles that are at least three inches high and may be as long as 10 inches. They are wide enough to accommodate cups as well as glasses and therefore, they should be at least three inches wide and can be as wide as five inches wide. The base member is preferred to be cupped in the bottom such that it will catch the liquid without splattering.

What is claimed is:

1. A receptacle for catching and retaining unwanted liquids dropped by a spigot;

said receptacle comprising a base member having an upper end, a closed lower end and integral, cylindrical side walls and back wall, said back wall having a top edge;

said back wall having a securement opening formed therethrough and near the top edge of the back wall, said opening having a serpentine configuration and being of sufficient size to allow the attachment of the receptacle to liquid dispensing equipment.

2. A receptacle as claimed in claim 1 that is manufactured from a material selected from the group consisting of a. rubbers,
b. elastomers,
c. resins, and
d. plastics.

3. A receptacle as claimed in claim 2 wherein the plastic is selected from the group consisting of a. polyethylene,
b. polypropylene, and
c. terephthalates.

4. A receptacle for catching and retaining unwanted liquids dropped by a spigot;

said receptacle comprising a base member having an upper end, a closed lower end and integral, cylindrical side walls and back wall, said back wall having a top edge;

said back wall having a securement opening formed therethrough and near the top edge of the back wall, said opening being of sufficient size to allow the attachment of the receptacle to liquid dispensing equipment, said opening being surmounted by a flexible patch, said flexible patch having essentially centered therein, a cut serpentine configuration.

5. A receptacle as claimed in claim 4 that is manufactured from a material selected from the group consisting of a. rubbers,
b. elastomers,
c. resins, and
d. plastics.

6. A receptacle as claimed in claim 5 wherein the plastic is selected from the group consisting of a. polyethylene,
b. polypropylene, and
c. terephthalates.

7. A receptacle as claimed in claim 4 wherein the flexible patch is manufactured from a material selected from the group consisting of a. rubbers,
b. elastomers,
c. resins, and
d. plastics.

8. A receptacle as claimed in claim 5 wherein the flexible patch is manufactured from a plastic that is selected from the group consisting of a. polyethylene,
b. polypropylene, and
c. terephthalates.

* * * * *